(12) United States Patent
Hodges

(10) Patent No.: US 11,807,561 B2
(45) Date of Patent: Nov. 7, 2023

(54) PIVOTAL DEWATERING PANELS AND ASSOCIATED SUPPORTING FRAMEWORK

(71) Applicant: RDS IP Holdings LLC, Monument, CO (US)

(72) Inventor: Michael Hodges, Colorado Springs, CO (US)

(*) Notice: Subject to any disclaimer, the term of this patent is extended or adjusted under 35 U.S.C. 154(b) by 0 days.

(21) Appl. No.: 16/980,048

(22) PCT Filed: Mar. 7, 2019

(86) PCT No.: PCT/US2019/021118
§ 371 (c)(1),
(2) Date: Sep. 11, 2020

(87) PCT Pub. No.: WO2019/177859
PCT Pub. Date: Sep. 19, 2019

(65) Prior Publication Data
US 2021/0008470 A1    Jan. 14, 2021

Related U.S. Application Data

(60) Provisional application No. 62/642,691, filed on Mar. 14, 2018.

(51) Int. Cl.
| | |
|---|---|
| C02F 11/128 | (2019.01) |
| B01D 29/05 | (2006.01) |
| B01D 29/52 | (2006.01) |
| B01D 29/64 | (2006.01) |
| B01D 29/96 | (2006.01) |
| B01D 39/08 | (2006.01) |
| C02F 103/00 | (2006.01) |

(52) U.S. Cl.
CPC .......... *C02F 11/128* (2013.01); *B01D 29/05* (2013.01); *B01D 29/52* (2013.01); *B01D 29/6438* (2013.01); *B01D 29/96* (2013.01); *B01D 39/083* (2013.01); *B01D 2201/4023* (2013.01); *C02F 2103/007* (2013.01); *C02F 2303/16* (2013.01)

(58) Field of Classification Search
CPC .... B01D 29/05; B01D 29/6438; B01D 29/96; B01D 29/965; B01D 2201/287; B01D 25/34; B01D 25/343; B01D 25/38; B01D 25/386; C02F 11/128; C02F 2303/16
USPC ................................................. 210/791, 391
See application file for complete search history.

(56) References Cited

U.S. PATENT DOCUMENTS 3,056,504 A * 10/1962 Lavallee ................ B01D 33/76
                                                            210/328
3,812,971 A    5/1974 Yamamoto
4,116,838 A * 9/1978 Lazzarotto ............. B01D 29/39
                                                            210/209

(Continued)

FOREIGN PATENT DOCUMENTS

DE         2127937         1/1973

*Primary Examiner* — Benjamin M Kurtz
(74) *Attorney, Agent, or Firm* — Leyendecker & Lemire, LLC

(57) ABSTRACT

An array of spaced dewatering panels mounted in a spaced relationship in a framework (collectively referred to herein as a "panel support system" or "panel system") is described wherein the panels are coupled to the framework in a manner that permits them to be pivoted or swiveled between at least a first orientation (or position) and a second orientation (position).

20 Claims, 5 Drawing Sheets

(56) References Cited

U.S. PATENT DOCUMENTS

| | | | | |
|---|---|---|---|---|
| 5,589,081 A | * | 12/1996 | Harris | B01D 29/23 |
| | | | | 210/804 |
| 5,707,535 A | * | 1/1998 | Harris | B01D 29/23 |
| | | | | 210/804 |
| 6,146,528 A | * | 11/2000 | Caughman, Jr. | B01D 29/05 |
| | | | | 210/236 |
| 7,396,464 B2 | | 7/2008 | Sternad | |
| 7,509,759 B2 | | 3/2009 | Langdon | |
| 7,976,705 B2 | | 7/2011 | Gagnon | |
| 2006/0011561 A1 | * | 1/2006 | Brouillard | B01D 29/23 |
| | | | | 210/767 |
| 2010/0181265 A1 | | 7/2010 | Schulte, Jr. | |

* cited by examiner

PIVOTAL DEWATERING PANELS AND ASSOCIATED SUPPORTING FRAMEWORK

CROSS-REFERENCE TO RELATED APPLICATION

This application claims the benefit of U.S. Provisional Application No. 62/642,691, filed Mar. 14, 2018.

BACKGROUND

Sedimentation occurs in virtually all waterways. The impact of sedimentation is profound in many ways. Sedimentation can, for instance, displace local ecosystems and hinder navigation as well as deprive users of the aesthetic value of a clear, deep body of water. Moreover, sediments can include contaminants of all types including those generally associated with eutrophication, such as phosphorous and nitrogen. Where industry exists in relation to these waterways other man-made contaminants are also commonly found.

Historically, the removal of contaminated, as well as clean, sediments typically comprises the use of bucket dredges wherein a bucket is lowered to the sea floor, scoops up the sediment and is deposits the sediment on a barge or nearby land for disposal. These types of dredges can disadvantageous in situations where the bucket's reach is limited and the nature of the body of water and its environs do not provide ample real estate for removed sediment deposition or the ability to use barges.

Hydraulic dredges in contrast have small footprints and can pump slurry at thousands of gallons per minute, at typical densities of 5-20% solids. They are often much more economical to operate. The solids can include up to brick-sized rocks and debris, sand and gravel as well as clays and organics, which are the natural results of run-off from farm fields, construction, underwater vegetation, and all other non-point runoff.

Almost all hydraulic dredging operations utilize a dewatering apparatus of some type to return free water and capillary water back to the waterway. This approach can be slow and tedious. In the dredging industry this disconnect between dredge flow and dewatering, results in 1:3 operational ratios wherein three hours of dewatering is required for every hour of hydraulic dredging. Geo-tubes can be used to contain the dredged slurry and improve the operational ratio but require 3-4 weeks (and large footprint), to fully dewater the slurry. As can be appreciated the foregoing operational ratio results in hydraulic dredging operations experiencing downtimes of about two thirds.

Recently developed slurry dewatering technologies, comprising a plurality of synergistic processes, promise to speed up dewatering and reduce hydraulic dredge downtime. A first operation removes bulky or large debris such as rocks, shells, garbage, and large plant matter. Next, the remaining slurry is sent to a desander that removes sand there from. After desanding, the slurry, which includes dissolved solids and fine undissolved solids, is agitated and a liquid polymer solution is added to flocculate the remaining solids. The flocculated solids and free water are separated in the next operation. Finally, the mostly solid flocculated mass is deposited in large bins or tanks for final removal of residual and capillary water. Once the water is removed the dry (or drained) solid mass can be processed in an appropriate and desired manner.

The bins comprise a perforated raised or false floor upon which the flocculated mass sits. The capillary water drains through the mass and through the raised floor where it is channeled from the container for final disposal or return to the associated body of water. To help facilitate and speed up the removal of residual and capillary water, spaced panels having perforated face sheets and hollow cores are secured to a framework that is placed in the bin. The panel face sheets are typically covered in a geosynthetic fabric material to prevent the mass from entering the hollow cores through the perforations but permit water to pass there through. The capillary water is drawn from the mass through the fabric and perforations and into the hollow core wherein it flows downwardly to the false floor and ultimately out of the bin.

As can be appreciated, the passive capillary dewatering bins can be the speed determinative operation in the entire dewatering process. The panels help speed up the process considerably; however, before reusing the bins, the framework and panels most be removed and cleaned and the solid mass must be removed from the bins. Cleaning the panels, which are typically about three feet wide and spaced three feet apart in the framework, comprises spraying down the panels, such as with a power washer, to clean any residual solids from the fabric surface. Because of the closeness of the parallel panels to each other, it can be difficult and time consuming for a person operating a power washer to effectively clean the panel surfaces thereby increasing the turnaround time required to put a cleaned bin and panel system back into service.

DETAILED DESCRIPTION

Figure 1:
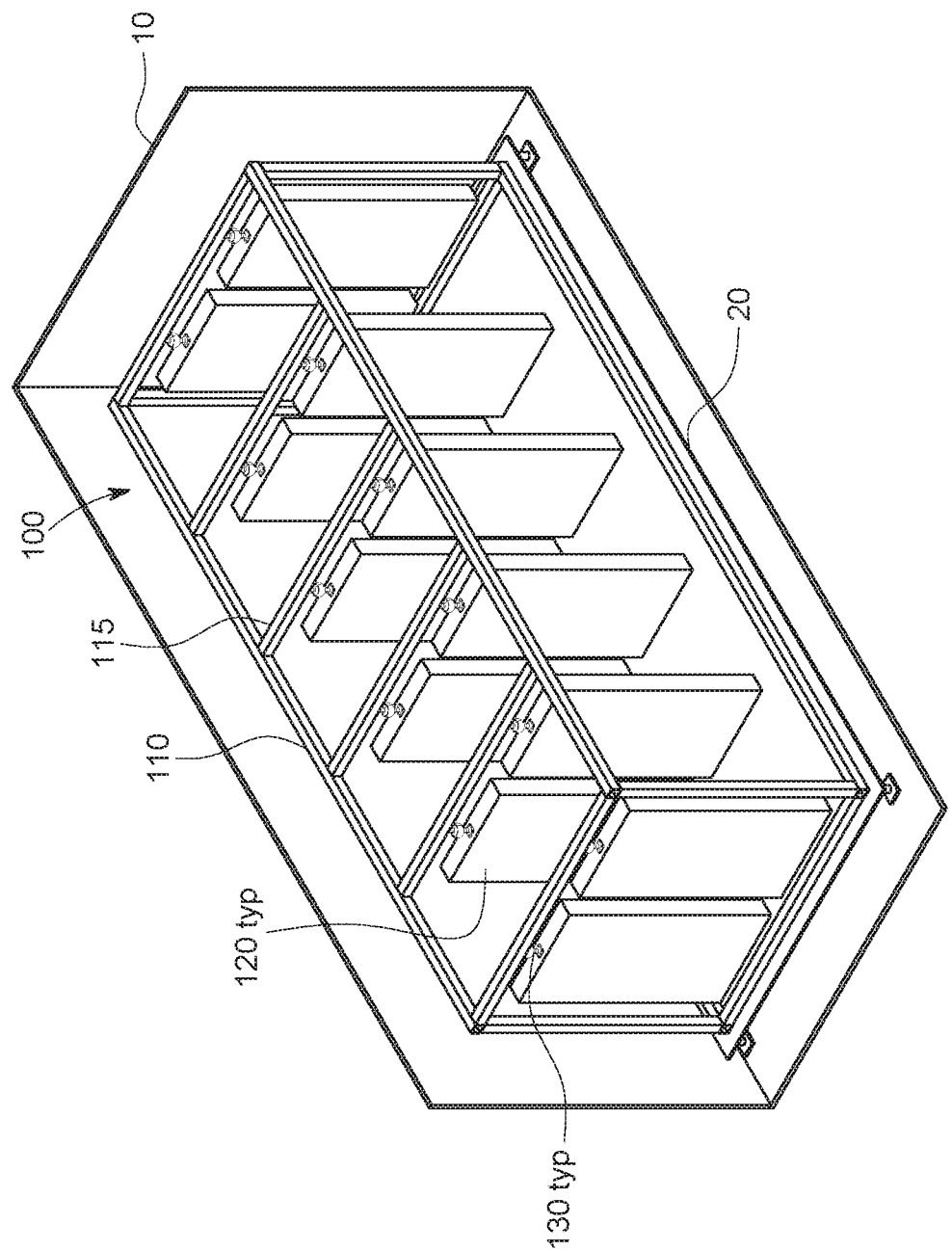
FIG. 1 is a perspective view of panel support system according to an embodiment of the present invention.

Embodiments of the present invention comprise an array of spaced dewatering panels of mounted in a spaced relationship in a framework (collectively referred to herein as a "panel support system" or "panel system") wherein the panels are coupled to the framework in a manner that permits each of them to be pivoted or swiveled from a first orientation (or position) to at least a second orientation (position). Specifically, in a first orientation the panel face sheets are generally parallel with each other with at least one face from each panel directly faces a face sheet from another panel. In a second orientation, the panels are positioned such that the face sheets of the various panels in a particular row are generally aligned in series with each other. The ability to swivel the panels to a third orientation (position) wherein the panel's face sheets are also generally aligned in series with each other but with the opposite face sheets facing outwardly is also contemplated. Embodiments of the invention further include the combination of the panels and framework received in a dewatering bin. Yet other embodiments of the present invention include the methodologies of dewatering a flocculated mass using the panel support system, as well as, the methodologies of cleaning the panel support system by pivoting the panels between at least first and second positions.

Most simply, the framework is typically comprised of elongated steel members, such as square tubing or steel angle, formed into a cuboid lattice having a top side comprising a plurality of spaced horizontal rungs. Dewatering panels comprising rigid hollow panels with perforated face sheets and an at least partially open bottom end that are attached to the horizontal rungs by way of a pivot joint, such as a ball joint. The perforated face sheets can be covered in a geosynthetic water permeable fabric to permit water from a flocculated mass to pass there through and into the panel's interior and eventually out the bottom of the panels. The panels are typically arranged in an array comprising several columns. The number of columns and number of panels in each column can vary depending on the size of the panels and the size of the framework, which is in turn dictated by the size of the bin in which it is to be received.

In use, the panel support system with the panels all arrayed in the first orientation is placed in an empty bin. The bin is then filled with flocculated mass from the dewatering process. Once filled, the water is permitted to drain from the mass, both directly through the perforated raised floor of the bin and through the panels. Once the mass is sufficiently dry, the panel frame system is lifted from the bin using a crane or excavator. The drained flocculated mass is removed from the bin using traditional means.

The panels of the removed panel support system are then cleaned as the panel support system is prepared for reuse. First, the panels are pivoted from the first orientation to the second orientation with one of the opposing face sheets of each panel facing outwardly. The outwardly facing face sheets are cleaned typically by spraying them down with water using a pressure washer. Next, the panels are pivoted about 180 degrees to move them into a third orientation wherein the opposing face sheets are outwardly facing. These face sheets are also cleaned by spraying them down. The panels are then moved back into the first position, and once the entire panel support system has been sufficiently cleaned, it is hoisted into either the same bin or another bin to repeat the process of dewatering flocculated mass.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "approximately" and "substantially" as used in this specification and appended claims, refers to plus or minus 10% of the value given.

The terms "about" and "generally" as used in this specification and appended claims, refers to plus or minus 20% of the value given.

Directional and/or reflationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Panel System

With reference to FIGS. 1-4, a panel support system is described. Generally, the panel system 100 comprises a framework 110 configured to fit within an associated receptacle bin 10. Attached to and hanging down from cross bars 115 of the framework are a plurality of panels 120. The panels are arranged in an array of one or more columns. The number of columns and the number of panels in each column depends on the size of the panels and the size of the bin in which the panel system is designed to be received. The panels are coupled to the cross bars 115 and supported by way of a pivot connector or joint that at a minimum permit each panel to be rotated about a vertical axis associated with the joint. In at least one embodiment the pivot connector comprises a ball joint 130.

The framework 110 is generally in the form of a rectangular cuboid that is designed to sit on a raised bottom of an associated bin 10. Typically, the various elongated members of the framework are comprised of steel and/or aluminum alloy square or rectangular tubes, C-section, and/or angle. The various elongated members can be welded, bolted or otherwise attached to each other to form the desired structure. To prevent undue corrosion, steel members may comprise a stainless steel alloy, be galvanized, and/or include a surface coating, such as paint or powder coat to protect it. Aluminum alloy members can also be coated and/or anodized to minimize the effects of corrosion. Notably, the framework 110 includes a plurality of substantially horizontal cross bars 115 that extend along the top side thereof permitting panels 120 to be coupled to them by way of the pivot joint 130.

Typical panels 120 are about three feet wide, 2-4 inches thick and five to eight feet long depending on the size and depth of the associated bin. However, size can vary substantially in variations. The panels are typically and primarily constructed of steel (often stainless steel) plate, although variations comprised of aluminum alloy or composite substantially rigid sheets are also contemplated. The panels comprise similar front and back face sheets 140 that include an array of through holes 150 distributed on the sheets. The holes permit water from a flocculated mass to enter the interior of the panel. The face sheets are parallel spaced from one another approximately the depth of the panel. The face sheets are connected with one another at least at their edges by way of a left side, a right side and a top side 170 and a bottom side 160 to form a generally hollow interior 180.

The top side 170 is typically comprised of a piece of steel or aluminum plate although in some variations it can comprise C-channel or other shapes. It is typically welded along its front and back elongated edges to the top edges of the front and back face sheets 140 although in some variations, such as those utilizing C-channel, the top side piece can be mechanically fastened and/or adhesively bonded to the face sheets. A ball joint 130 (or other pivot joint) is secured to the center of the ball top side and it is through this joint that the panel is hung from the a cross bar 115 of the framework 110.

The bottom side 160 is also typically comprised of a piece of steel or aluminum plate although in some variations it can also comprise C-channel or other shapes. It is typically welded along its front and back elongated edges to the bottom edges of the front and back face sheets 140 although in some variations, such as those utilizing C-channel, the bottom side piece can be mechanically fastened and/or adhesively bonded to the face sheets. The bottom side piece like the face sheets includes through-holes or other openings passing through it. In another variation, there is no bottom side piece and the bottom side itself is essentially an open side. In use, the bottom side is positioned just above the raised floor of the associated bin 10 so that water flowing down the inside of the panels can exit the panel's interior and flow through the perforated raised floor 20 and eventually out of the bin.

The left and right sides can comprise either solid pieces or pieces with through holes similar to those in the face sheets 140. Like the other sides, the left and right side pieces are welded or mechanically fastened to the adjacent edges of the face sheets. In combination the face sheets and the various sides form a hollow interior wherein water that drains into the interior through the provided through holes 150 from a flocculated mass can flow downwardly and out of the panel along its bottom side.

As can be appreciated, if the through-holes were directly exposed to the flocculated mass pressing up against the face sheets, depending on the size of the holes, some of the flocculated mass could fall into the panel's interior. Accordingly, to inhibit this from occurring, the front and back face sheets 140 and the left and right sides as applicable are typically covered in a water permeable fabric 190, such as a woven or nonwoven geotextile, that does not permit solid material above a predetermined size to pass there through. The geotextile can be secured to the panels by any suitable mechanism. Variations of the panel are also contemplated wherein some or all of the surface of the front and back face sheets comprise screens having appropriately sized openings to allow fluid to pass but inhibit the passage of solids thereby obviating the need to cover the face sheets with a geotextile or similar.

Each panel is attached to the framework 110 and specifically the cross bars 115 by a pivot joint (ball joint as shown) 130 that allows the panel to be pivoted about a substantially vertical axis of the joint into at least two positions and typically into at least three positions. In at least some variations, the joints permit the panels to be pivoted or rotated 360 degrees. Locking or brake mechanisms can be provided on each joint to secure the associated panel in one of the two or three positions. Alternatively, mechanisms that simultaneously secure a plurality of panels in one or more of the positions can be provided. For instance, a locking mechanism comprising pins that are received into receptacles in the top side of the panels wherein each pin is coupled to a common actuator can be used to secure (or release) a plurality of panels simultaneously. A ball (or ball and socket) joint 130 is illustrated in the attached figures. The ball joint permits the panels to not only be rotated about a vertical axis of the joint but give additional degrees of pivotal freedom as may be desired when cleaning the panels.

Figure 2A:
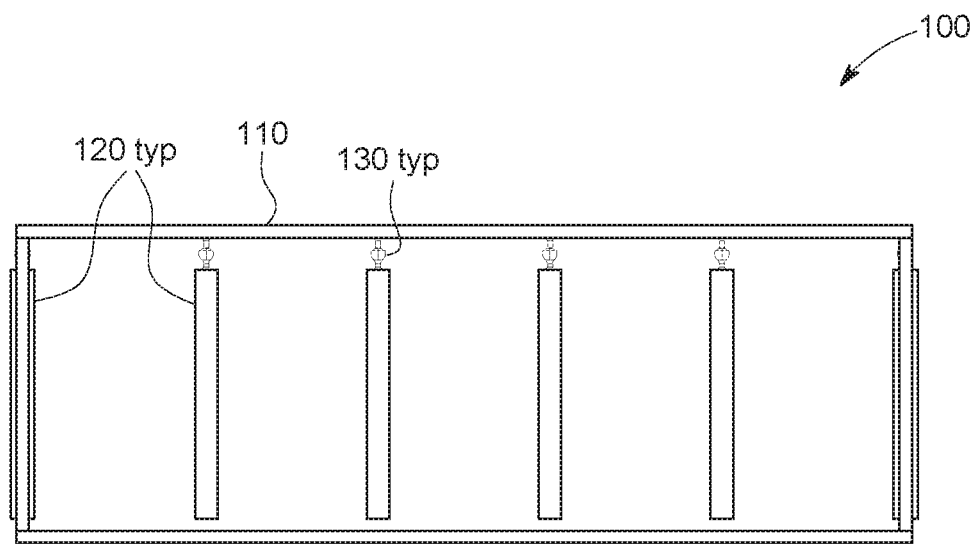
FIG. 2a is a side view of the panel support system showing the panels in a first position according to one embodiment of the present invention.
Figure 3A:
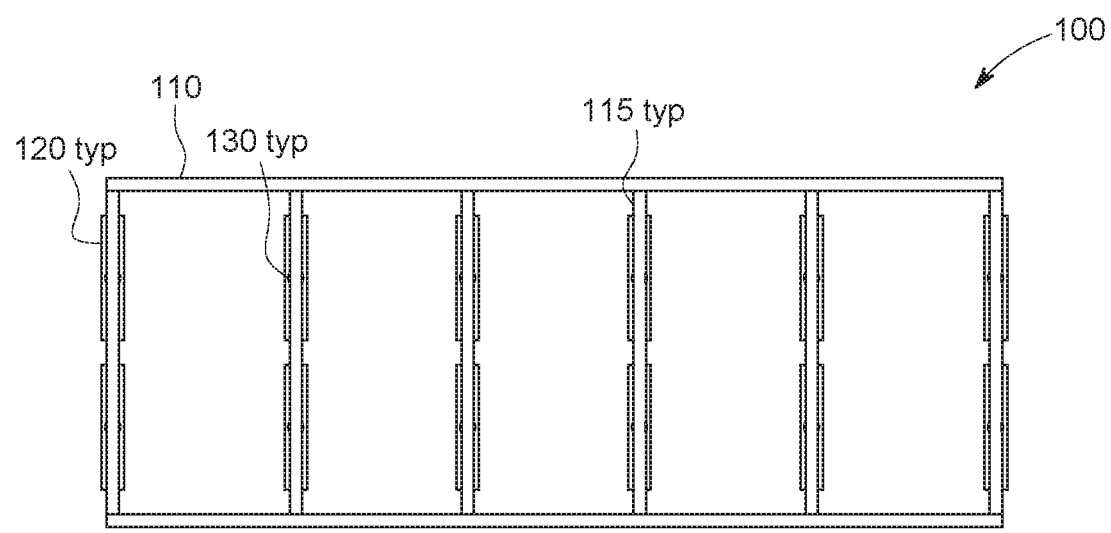
FIG. 3a is a top view of the panel support system showing the panels in a first position according to one embodiment of the present invention.

FIGS. 2a&b and 3a&b illustrate side and top views of the panel system 100 respectively. FIG. 2a and FIG. 3a show the panels in a first orientation with adjacent panels 120 in different columns that are connected to the same cross bar 115 are aligned with each other and the cross bar. At least one face sheet 140 of each panel in a column directly faces and is parallel with a corresponding face sheet in an adjacent panel in the column. It is in this configuration that the panels are placed into the bin 10 and the wet flocculated material is received and envelopes much of the panels to facilitate the dewatering process.

Figure 2B:
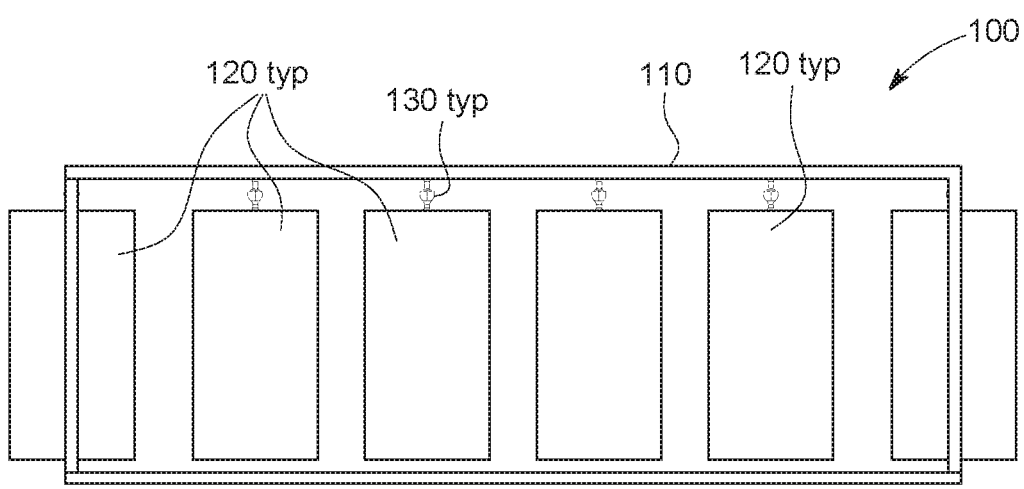
FIG. 2b is a side view of the panel support system showing the panels in a second position according to one embodiment of the present invention.
Figure 3B:
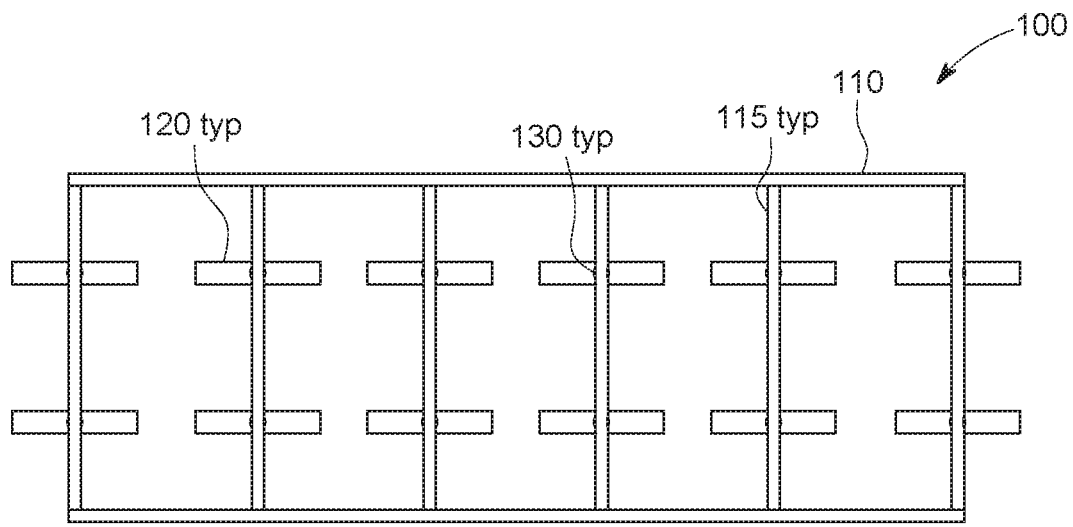
FIG. 3b is a top view of the panel support system showing the panels in a second position according to one embodiment of the present invention.
Figure 4:
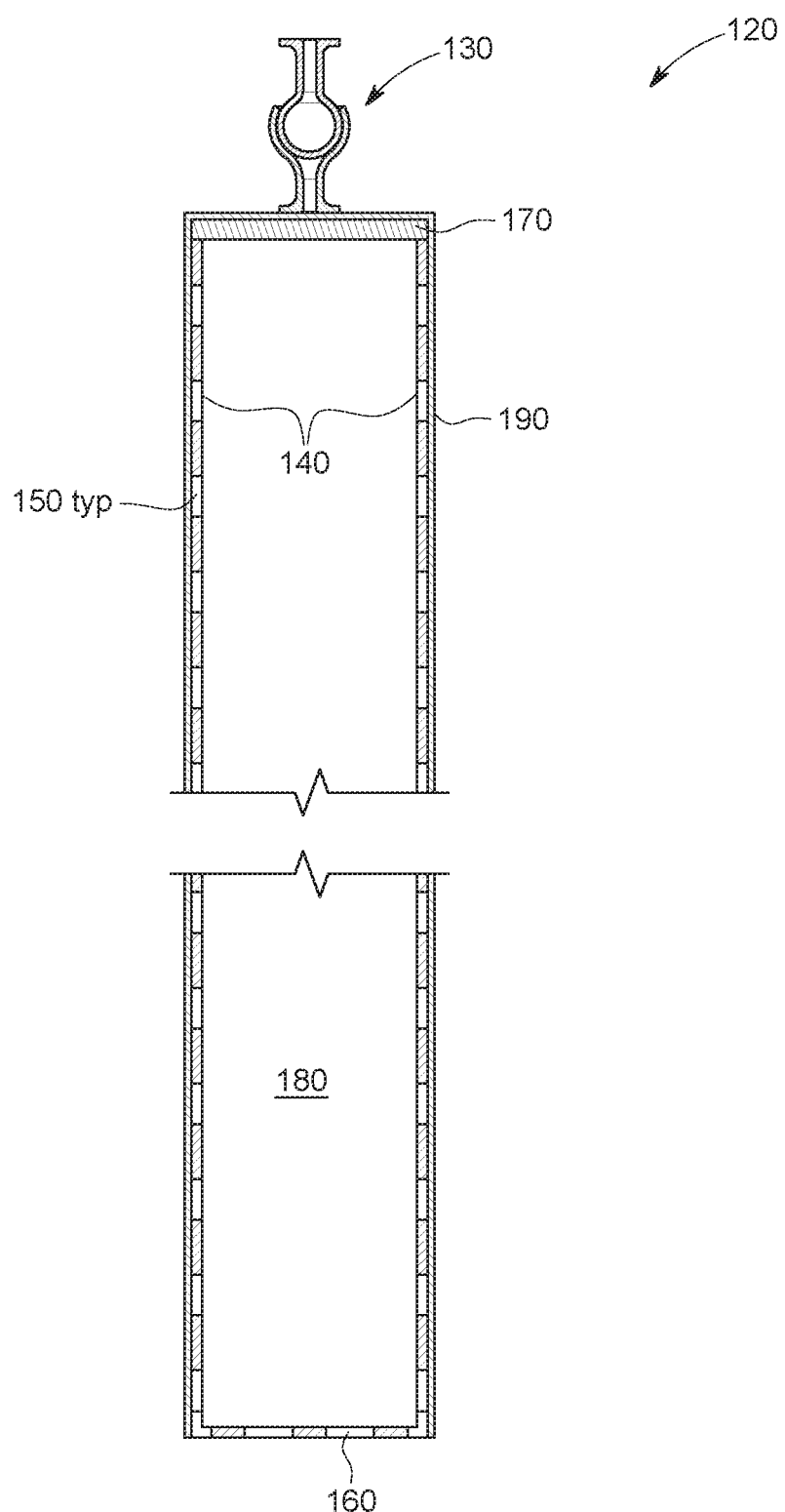
FIG. 4 is a cross sectional view of a panel of the panel support system according to one embodiment of the present invention.

FIG. 2b and FIG. 3b show the panels 120 in a second orientation with adjacent panels in different columns that are connected to the same cross bar 115 each having at least one face sheet 140 that directly faces and is parallel with a corresponding face sheet in an adjacent panel in the different column. The panels in the same columns are generally aligned with each other with one of the front and back face sheet of each panel facing outwardly. As can be appreciated in variations, the panels do not have to be aligned in the second position but can be canted relative to each other pivoted relative to the first position by approximately 45-90 degrees to adequately expose a face sheet for cleaning. The third position is essentially the opposite of the second position wherein the other of the front and back face sheets is facing outwardly.

Methods of Using Embodiments of the Panel System to Dewater a Flocculated Mass

Figure 5:
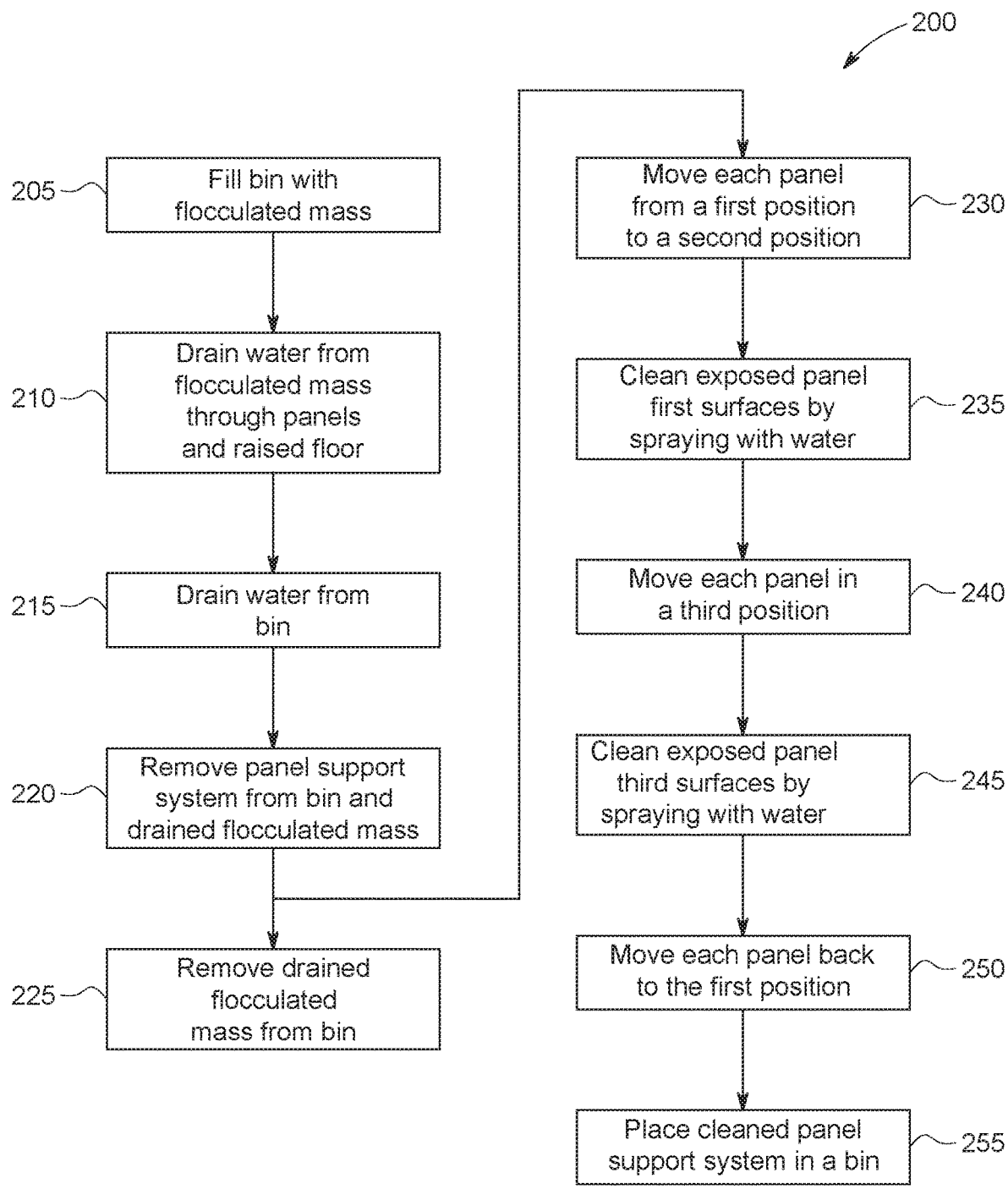
FIG. 5 is a flow chart pertaining to the dewatering of a flocculated mass using the panel support system according to one embodiment of the present invention.

A method of using and the panel system 100 including the cleaning of the panels between use is described with reference to the flow chart of FIG. 5.

Initially, a receptacle bin 10 with a panel system 100 received therein is filled with a flocculated mass saturated with capillary water as indicated in block 205.

The mass-laden bin is permitted to sit for a predetermined amount of time to allow the water to migrate from the flocculated mass either into the interior of a panel 120 or downwardly through the raised and perforated floor of the bin as indicated in block 210. The water from the interior 180 of the panels drain out the bottom sides 160 of the panels and through the raised floor 20. As per block 215, the water is drained from and out of the bin 10 typically along the base floor of the bin.

Once the flocculated mass is sufficiently dry (or drained), the panel system 100 is removed from the bin 10 usually by lifting it upwardly using a crane or a excavator as indicated in block 220. The panel system is typically moved to a cleaning area to be prepared for reuse. As indicated in block 225, the dried flocculated mass is removed from the bin and appropriately disposed.

Typically, the removed panel system 100 and in particular the geosynthetic fabric 190 covering each panel will have residual flocculated mass material resident on it. As can be appreciated, this residual mass can interfere with the free flow of water through the fabric, through the panel face sheets, and into the panel's interior 180. Accordingly, removal of the residual mass from the panels is desired.

Initially, as indicated in block 230, each panel 120 is moved from its first position to it second position so that one of each panel's face sheets 140 is facing outwardly. The exterior surface is then cleaned typically by spraying the fabric-covered face sheet with water using a pressure washer to dislodge any residual flocculated mass as indicated in block 235.

With reference to block 240, each panel 100 is then moved into the third position typically from the second position. The exterior surface is then cleaned typically by spraying this other fabric-covered face sheet 120 with water using a pressure washer to dislodge any residual flocculated mass as indicated in block 245.

Once the panels 120 have been cleaned, they are each moved back into the first position as indicated in block 250. The panel system 100 is then ready for reuse and is hoisted back into a bin 10 as indicated in block 255.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, variations of panel system can include an automatic means for moving the panels either individually or in groups to and from the various positions. This automatic means can comprise one or more electric motors directly or indirectly coupled with the panels and/or the pivot joints. The pivot joints may include a biasing mechanism to bias the panels in a particular position, such as the first position. A locking mechanism may be used to hold the panels in the second and/or third position.

As can be appreciated the actual configuration of the framework, the number of panels and the array configuration of the panels can vary substantially from the embodiment presented herein. Further, the panels themselves may differently configured. In one variation the front and back face sheets are slightly curved or arcuate and the edges left and right edges thereof meet eliminating the need for distinct left and right sides. In yet other variations, the panels can be constructed of a single face sheet having front and back sides that may be covered with a water permeable fabric wherein the water migrates from the flocculated mass and flows down the surface of the face sheets towards the bin's raised floor. With the forgoing design, the face sheet can have a textured surface that forms channels to direct the water downwardly.

I claim:

1. A panel system for use in removing capillary water from a flocculated mass, the panel system comprising:
    a plurality of panels, each panel having,
        (a) generally parallel and spaced apart first and second substantially rigid face sheets forming a hollow interior there between, each of the face sheets having (i) a back surface facing a back surface of the other face sheet within the hollow interior, (ii) a front surface opposite the back surface facing outwardly of the panel, and (iii) an array of openings distributed over the face sheet and extending from the front surface through to the back surface,
        (b) top, bottom, left and right sidewalls, each of the sidewalls being joined to the first and second face sheets along edges thereof, the bottom sidewall being one of (i) an open sidewall and (ii) including openings to permit water to flow outwardly from the hollow interior,
        (c) one or more sheets of water permeable fabric, the fabric sheets being attached to the panel and substantially covering the array of openings on the first and second face sheets;
    a framework with each panel of the plurality of panels suspended therefrom; and
    a plurality of pivot support joints, each pivot support joint (i) being coupled to the framework and to a panel of the plurality of panels, (ii) allowing the associated panel to pivot from at least a first position to at least a second position along a generally vertical axis, and (iii) comprising a ball joint.

2. The panel system of claim 1, wherein the water permeable fabric comprises a woven or non-woven geosynthetic.

3. The panel system of claim 1, wherein:
    (a) the plurality of panels are arranged in at least one column with the support joints associated with panels in the at least one column being linearly aligned; and
    (b) in the first position the outer surface of at least one of the first and second face sheets of each panel directly faces and is generally parallel with the outer surface of an adjacent panel.

4. The panel system of claim 1, wherein:
    (a) the plurality of panels are arranged in at least one column with the support joints associated with panels in the at least one column being linearly aligned; and
    (b) in the second position the first and second face sheets of each panel are generally linearly aligned with the first and second face sheets of an adjacent panel.

5. The panel system of claim 3, wherein in the second position the first and second face sheets of each panel are generally linearly aligned with the first and second face sheets of an adjacent panel.

6. The panel system of claim 1, wherein the support joints can each pivot at least 90 degrees about a generally vertical axis.

7. The panel system of claim 1, wherein the support joints each include a pivot lock to releasably secure the support joint in one or both of the first and second positions.

8. The panel support system of claim 1, wherein two or more panels of the plurality of panels are coupled together by way of a pivotal actuator, the pivotal actuator configured to move the two or more panels between the first and second positions.

9. The panel support system of claim 8, wherein the pivotal actuator includes a locking mechanism to releasably secure the two or more panels in one or both of the first and second positions.

10. A capillary dewatering system comprising the panel support system of claim 1 in combination with a receptacle bin in which the panel support system is substantially received in a bin interior, the receptacle bin comprising one or more generally vertical sides, a base floor, and a water permeable raised floor overlying the base floor.

11. The capillary dewatering system of claim 10, wherein the receptacle bin is rectangular box with four vertical sides, wherein at least one of the four vertical sides can be one of opened and removed permitting access to the bin interior therefrom.

12. The capillary dewatering system of claim 10, wherein the raised floor is covered in a geosynthetic fabric.

13. A method of drying a flocculated mass using the capillary dewatering system of claim 10, the method comprising:
   filling the receptacle bin with the flocculated mass containing capillary water;
   draining the capillary water from the flocculated mass through the fabric sheets, passing the capillary water through the array of openings, into the hollow interior of each panel, down the panel, and through the raised floor; and
   draining the capillary water out of the receptacle bin.

14. The method of claim 13, further comprising draining the water from the flocculated mass directly through the raised floor.

15. The method of claim 13, further comprising removing the panel support system from the bin once the flocculated mass has drained sufficiently.

16. A method of cleaning the panels of the panel support system of claim 5, the method comprising:
   moving each panel of the plurality of panels from the first position to the second position;
   spraying each panel with a stream of water to wash debris from at least one face surface of the panel;
   after washing, returning each panel of the plurality of panels from the second position to the first position.

17. A method of cleaning the panels of claim 16 wherein each joint allows the associated panel to further pivot to a third position along a generally vertical axis with the panel in the third position being rotated about 180 degrees relative to the panel in the second position.

18. A panel system for use in removing capillary water from a flocculated mass, the panel system comprising:
   a plurality of panels, each panel having (a) generally parallel and spaced apart first and second substantially rigid face sheets forming a hollow interior there between, each of the face sheets having (i) a back surface facing a back surface of the other face sheet within the hollow interior, (ii) a front surface opposite the back surface facing outwardly of the panel, and (iii) an array of openings distributed over the face sheet and extending from the front surface through to the back surface; (b) top, bottom, left and right sidewalls, each of the sidewalls being joined to the first and second face sheets along edges thereof, the bottom sidewall being one of (i) an open sidewall and (ii) including openings to permit water to flow outwardly from the hollow interior; and (c) one or more sheets of water permeable fabric, the fabric sheets being attached to the panel and substantially covering the array of openings on the first and second face sheets;
   a framework with each panel of the plurality of panels suspended therefrom; and
   a plurality of pivot support joints, each pivot support joint (i) being coupled to the framework and to a panel of the plurality of panels, and (ii) allowing the associated panel to pivot from at least a first position to at least a second position along a generally vertical axis;
   wherein (i) the plurality of panels are arranged in at least one column with the support joints associated with panels in the at least one column being linearly aligned; and (ii) in the second position, the first and second face sheets of each panel are generally linearly aligned with the first and second face sheets of an adjacent panel.

19. A panel system for use in removing capillary water from a flocculated mass, the panel system comprising:
   a plurality of panels, each panel having (a) generally parallel and spaced apart first and second substantially rigid face sheets forming a hollow interior there between, each of the face sheets having (i) a back surface facing a back surface of the other face sheet within the hollow interior, (ii) a front surface opposite the back surface facing outwardly of the panel, and (iii) an array of openings distributed over the face sheet and extending from the front surface through to the back surface; (b) top, bottom, left and right sidewalls, each of the sidewalls being joined to the first and second face sheets along edges thereof, the bottom sidewall being one of (i) an open sidewall and (ii) including openings to permit water to flow outwardly from the hollow interior; and (c) one or more sheets of water permeable fabric, the fabric sheets being attached to the panel and substantially covering the array of openings on the first and second face sheets;
   a framework with each panel of the plurality of panels suspended therefrom; and
   a plurality of pivot support joints, each pivot support joint (i) being coupled to the framework and to a panel of the plurality of panels, and (ii) allowing the associated panel to pivot from at least a first position to at least a second position along a generally vertical axis;
   wherein two or more panels of the plurality of panels are coupled together by way of a pivotal actuator, the pivotal actuator configured to move the two or more panels between the first and second positions.

20. A capillary dewatering system comprising:
   a panel support system in combination with a receptacle bin;
   the panel support system including:
      a plurality of panels, each panel having (a) generally parallel and spaced apart first and second substantially rigid face sheets forming a hollow interior there between, each of the face sheets having (i) a back surface facing a back surface of the other face sheet within the hollow interior, (ii) a front surface opposite the back surface facing outwardly of the panel, and (iii) an array of openings distributed over the face sheet and extending from the front surface through to the back surface; (b) top, bottom, left and right sidewalls, each of the sidewalls being joined to the first and second face sheets along edges thereof, the bottom sidewall being one of (i) an open sidewall and (ii) including openings to permit water to flow outwardly from the hollow interior; and (c) one or more sheets of water permeable fabric, the fabric sheets being attached to the panel and substantially covering the array of openings on the first and second face sheets;
      a framework with each panel of the plurality of panels suspended therefrom; and
      a plurality of pivot support joints, each pivot support joint (i) being coupled to the framework and to a panel of the plurality of panels, and (ii) allowing the associated panel to pivot from at least a first position to at least a second position along a generally vertical axis;
   wherein (i) the panel support system is substantially received in a bin interior of the receptacle bin; and (ii)

the receptacle bin comprises one or more generally vertical sides, a base floor, and a water permeable raised floor overlying the base floor.

* * * * *